United States Patent

Ziph et al.

[11] Patent Number: 5,864,770
[45] Date of Patent: Jan. 26, 1999

[54] SPEED AND POWER CONTROL OF AN ENGINE BY MODULATION OF THE LOAD TORQUE

[76] Inventors: Benjamin Ziph, 1501 Hillridge, Ann Arbor, Mich. 48103; Scott Strodtman, 6501 Carpenter, Ypsilanti, Mich. 48197; Thomas K Rose, 7159 Lakeshore Dr., Chelsea, Mich. 48118

[21] Appl. No.: 615,446

[22] Filed: Mar. 14, 1996

[51] Int. Cl.$^6$ .............................. H02P 9/48; B60K 28/16
[52] U.S. Cl. .......................... 701/110; 701/84; 701/101; 123/339.16; 123/339.24; 60/524; 180/65.3
[58] Field of Search .................... 701/99, 100, 101, 701/110, 84, 90; 180/165, 65.3; 60/431, 451, 517, 524; 123/319, 339.16, 339.24

[56] References Cited

U.S. PATENT DOCUMENTS

| | | | |
|---|---|---|---|
| 4,593,581 | 6/1986 | Omitsu | 477/43 |
| 4,642,547 | 2/1987 | Redlich | 60/520 |
| 4,873,826 | 10/1989 | Dhar | 60/641.14 |
| 4,977,508 | 12/1990 | Tanaka et al. | 364/431.08 |
| 5,095,701 | 3/1992 | Nakano | 60/521 |
| 5,459,662 | 10/1995 | Tezuka et al. | 364/426.032 |
| 5,469,820 | 11/1995 | Data et al. | 123/192.2 |
| 5,552,640 | 9/1996 | Sutton et al. | 290/40 B |

FOREIGN PATENT DOCUMENTS

| | | |
|---|---|---|
| 373792 | 6/1990 | European Pat. Off. . |
| 63-235649 | 9/1988 | Japan . |
| 04299100 | 10/1992 | Japan . |
| WO9008891 | 8/1990 | WIPO . |

*Primary Examiner*—Tan Q. Nguyen
*Attorney, Agent, or Firm*—Harness, Dickey & Pierce, P.L.C.

[57] ABSTRACT

A system and method of speed and power control for an engine in which speed and power of the engine is controlled by modulation of the load torque. The load torque is manipulated in order to cause engine speed, and hence power to be changed. To accomplish such control, the load torque undergoes a temporary excursion in the opposite direction of the desired speed and power change. The engine and the driven equipment will accelerate or decelerate accordingly as the load torque is decreased or increased, relative to the essentially fixed or constant engine torque. As the engine accelerates or decelerates, its power increases or decreases in proportion.

13 Claims, 5 Drawing Sheets

SPEED AND POWER CONTROL OF AN ENGINE BY MODULATION OF THE LOAD TORQUE

BACKGROUND AND SUMMARY OF THE INVENTION

The present invention relates to a system and method for speed and power control of an engine, and in particular, to controlling the speed and power of the engine by modulation of the load torque. The invention is useful for a variety of engines, including a Stirling cycle engine.

A Stirling cycle engine is a heat engine in which a variable volume chamber of a higher temperature is connected to a variable volume chamber of a lower temperature through a regenerator. A gaseous fluid is transferred back and forth between the chambers and through the regenerator in a closed cycle. A Stirling cycle engine may be powered by a variety of heat sources, including solar and the combustion of fossil fuels. The output mechanical energy of the engine can be used to do direct work or for the generation of electrical energy, etc.

Due to the high efficiency and low emissions of a Stirling cycle engine as compared to Otto cycle (spark ignition) and Diesel cycle internal combustion engines, Stirling engines are being looked at for use in motor vehicles to improve fuel efficiency and to reduce exhaust emissions. At present, one especially promising application of a Stirling engine in a motor vehicle is in what is called a series hybrid electric vehicle. In a series hybrid electric vehicle, the engine drives a generator to produce electricity to augment electric power stored in batteries. Electric power from the generator and batteries drive the vehicle through electric motors coupled to the traction wheels. Energy produced by the engine-generator in excess of the road demand during vehicle operation is stored in batteries and used during periods of high power demand. This enables the engine to operate continuously at a fixed engine output torque.

The assignee of the present application, Stirling Thermal Motors, Inc., has made significant advances in the technology of Stirling engines over a number of years. Examples of such innovations include the development of a compact and efficient basic Stirling engine configuration employing a parallel cluster of double acting cylinders which are coupled mechanically through a rotating swashplate. In many applications, a swashplate actuator is implemented to enable the swashplate angle and, therefore, the piston stroke to be changed in accordance with operating requirements. By changing the swashplate angle, the torque, and thus the power output of the engine, can be changed. However, to provide a variable angle swashplate adds significant complexity and cost to the Stirling engine. U.S. Pat. No. 4,994,004, herein incorporated by reference, illustrates a Stirling engine having a variable angle swashplate.

The engine torque can also be varied by changing the temperature difference between the hot and cold sides of the engine. Generally speaking, however, a Stirling engine operates most efficiently with a large temperature difference. Consequently, if torque and power are modulated by decreasing the temperature difference, the engine efficiency would also be reduced.

The working fluid mean pressure can also be varied to change engine torque and power by varying the amount of working gas in the engine. To provide a means to change the fluid pressure, however, significantly adds to the complexity and cost of the engine. Moreover, like changing temperature, such an approach to output modulation would impose an efficiency penalty.

The lowest cost and simplest engine design is one with a fixed swash plate and a constant working fluid charge. The greatest efficiency is produced with a constant maximum operating temperature. With the maximum temperature, fluid mean pressure and swashplate angle fixed, it is an objective of the present invention to provide a method of controlling engine power.

With the internal operating parameters, i.e., temperature, charge pressure and displacement of the Stirling engine fixed at chosen values, the engine develops an essentially constant torque, $T_E$, regardless of engine speed. The engine power, $P_E$, then is essentially proportional to the engine speed, $\omega$. Speed, and thus power, may be varied by adjusting the load driven by the engine. The engine and the driven equipment (generator) will accelerate or decelerate accordingly as the load torque is decreased or increased, relative to the essentially fixed or constant engine torque. As the engine accelerates or decelerates, its power, $P_E$, increases or decreases in proportion. The load power, $P_L$, however, depends on the load torque, $T_L$, since power is a product of the torque and speed. In accordance with this invention, load torque $T_L$ is manipulated in order to cause the engine speed, and hence power, $P_E$ to be changed. In order to accomplish such control, the load torque, $T_L$ must undergo a temporary excursion in the direction opposite the desired change. The temporary excursion of power in the "wrong direction" requires power from a secondary source, such as the traction batteries in hybrid vehicle applications, to assist during the transient event to smooth out the net powered delivered.

The load control approach in accordance with this invention can be used directly as part of an automatic feedback control of the engine speed. It can also be used, indirectly, as part of an automatic feedback control of the power.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
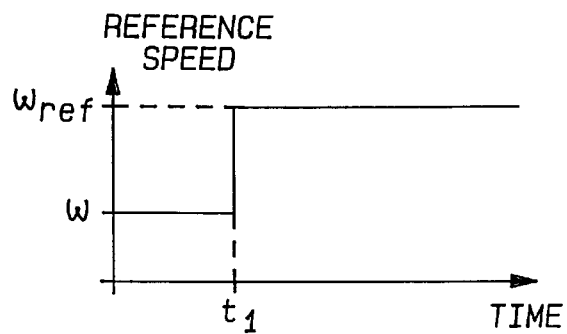
FIG. 1 is a graph of engine speed with respect to time illustrating a desired step change in engine speed.

The dynamic response of the speed, torque and power of a Stirling engine to a step change in the desired reference speed is shown in FIGS. 1 through 4 in a representative speed and power change scenario. In FIG. 1, the desired speed of the engine is changed from its present actual speed, $\omega$, to a reference speed, $\omega_{ref}$, at the time, $t_1$. Since the engine torque, $T_E$, is essentially fixed at all speeds, an actual increase in the engine speed produces an increase in engine power.

Figure 2:
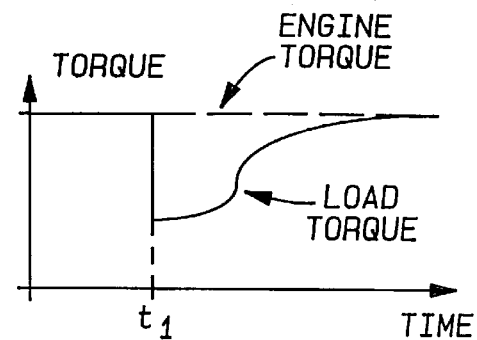
FIG. 2 is a graph of load torque with respect to time illustrating how load torque is changed in order to effectuate a speed change.
Figure 3:
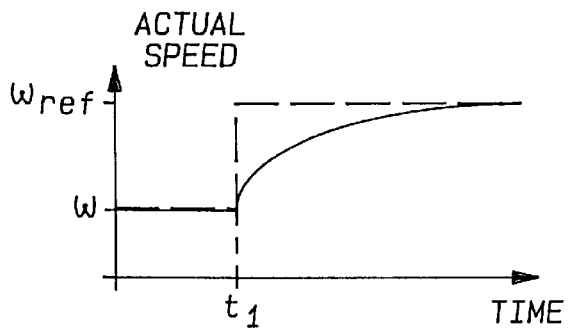
FIG. 3 is a graph of actual engine speed with respect to time illustrating an actual speed change in response to the change in load torque.

To accomplish the desired increase in speed, the load torque is decreased at time $t_1$, as shown in FIG. 2. Many types of load can be controlled in terms of their load torque. For example, a signal applied to various types of electrical alternators or generators controls the load torque. This creates a difference between the engine torque, $T_E$, which remains essentially constant, and the load torque, $T_L$. It should be noted that this change of torque can be thought of as in the "wrong" direction, i.e., to ultimately increase the load power, the load torque is first decreased, producing a lower power setting than desired. After this drop, the load torque is gradually raised until it reaches the engine torque. As a result of the step decrease in the load torque, the engine and the driven equipment will accelerate due to the load torque being less than the engine torque. This process is governed by the relation:

$$T_E - T_L = I d\omega/dt \qquad (1)$$

where I is the combined inertia of the engine and the driven equipment, $\omega$ is the engine speed and t is time. The increase in the actual speed relative to the step increase in the reference speed is shown in FIG. 3.

Figure 4:
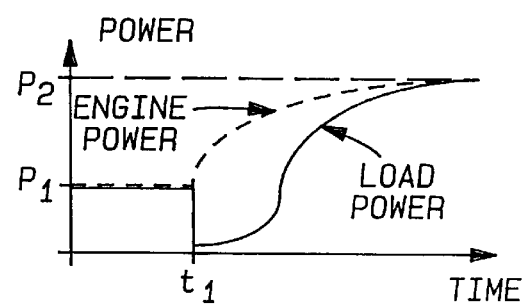
FIG. 4 is a graph of load and engine power with respect to time illustrating how load and engine power change as a speed change is carried out.

FIG. 4 shows the resulting change in engine power, $P_E$, and load power, $P_L$. These curves are the product of the actual speed shown in FIG. 3 and the engine torque and load torque shown in FIG. 2. Over time, as the load torque increases, the engine power and load power will converge at the desired increased power level shown as $P_2$.

While the example shown in FIGS. 1 through 4 is a speed increase, it is understood that a speed decrease is controlled in the same manner. In that case, the load torque also undergoes a temporary excursion in the "wrong" direction, i.e., the load torque would be increased to produce a resulting decrease in the reference speed.

Figure 5:
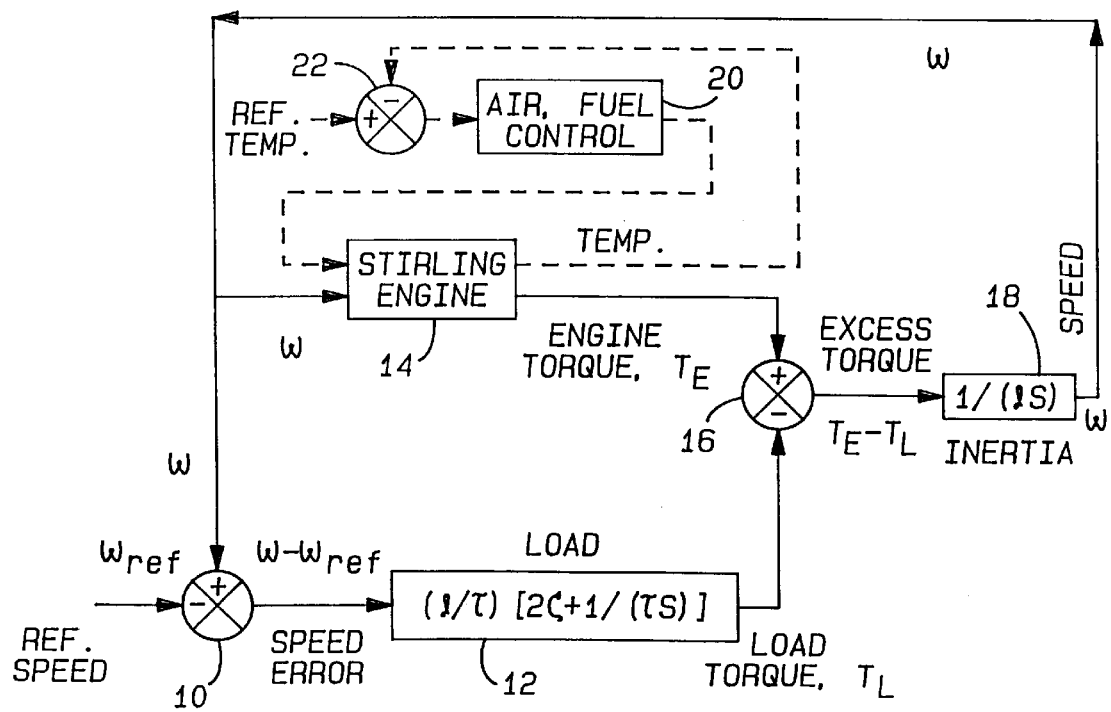
FIG. 5 is a block diagram illustrating the speed control scheme according to this invention.

A simplified block diagram in FIG. 5 shows a speed control system according to this invention. The purpose is to have the engine speed respond to an external speed demand, $\omega_{ref}$, by accelerating or decelerating the engine and the driven equipment from its current speed $\omega$, to the speed $\omega_{ref}$.

The speed demand, $\omega_{ref}$, is compared to the actual speed, $\omega$, at 10 to determine a speed error or a desired speed change. A transfer function $\mathcal{L}$, shown at 12, is used to determine a load torque, $T_L$, to produce the desired speed change. For stability, the transfer function, $\mathcal{L}$, must contain a proportional term and an integral term (a PI controller), as follows:

$$\mathcal{L} = (I/\tau)[2\zeta + 1/(\tau S)] \qquad (2)$$

Where $\tau$ and $\zeta$ are constant gains, $\tau$ is the time constant and $\zeta$ is the damping coefficient. S is the differential operator.

The load torque $T_L$ is compared at 16 to the engine torque, $T_E$ from the Stirling engine 14. The difference, $T_E - T_L$, according to its sign, accelerates the system per equation (1) above. This is shown in a block diagram as a transfer function, $1/(IS)$, S being the differential operator. This produces a new engine speed $\omega$ which is again compared to the reference speed $\omega_{ref}$, at 10 in a control loop.

In the example illustrated in FIGS. 1 through 4, as the engine accelerates and its power increases proportionally, its hot side temperature is maintained by increasing the heat supply to the engine. This is shown in FIG. 5 as the air/fuel control 20. However, the invention is not limited to an engine in which the heat is supplied by air and fuel combustion. Other heat sources can be used. The engine temperature is an independent loop that is triggered by the tendency of the temperature to change when the heat input no longer corresponds to the engine power output. The actual engine temperature is compared to the reference temperature at 22.

Figure 6:
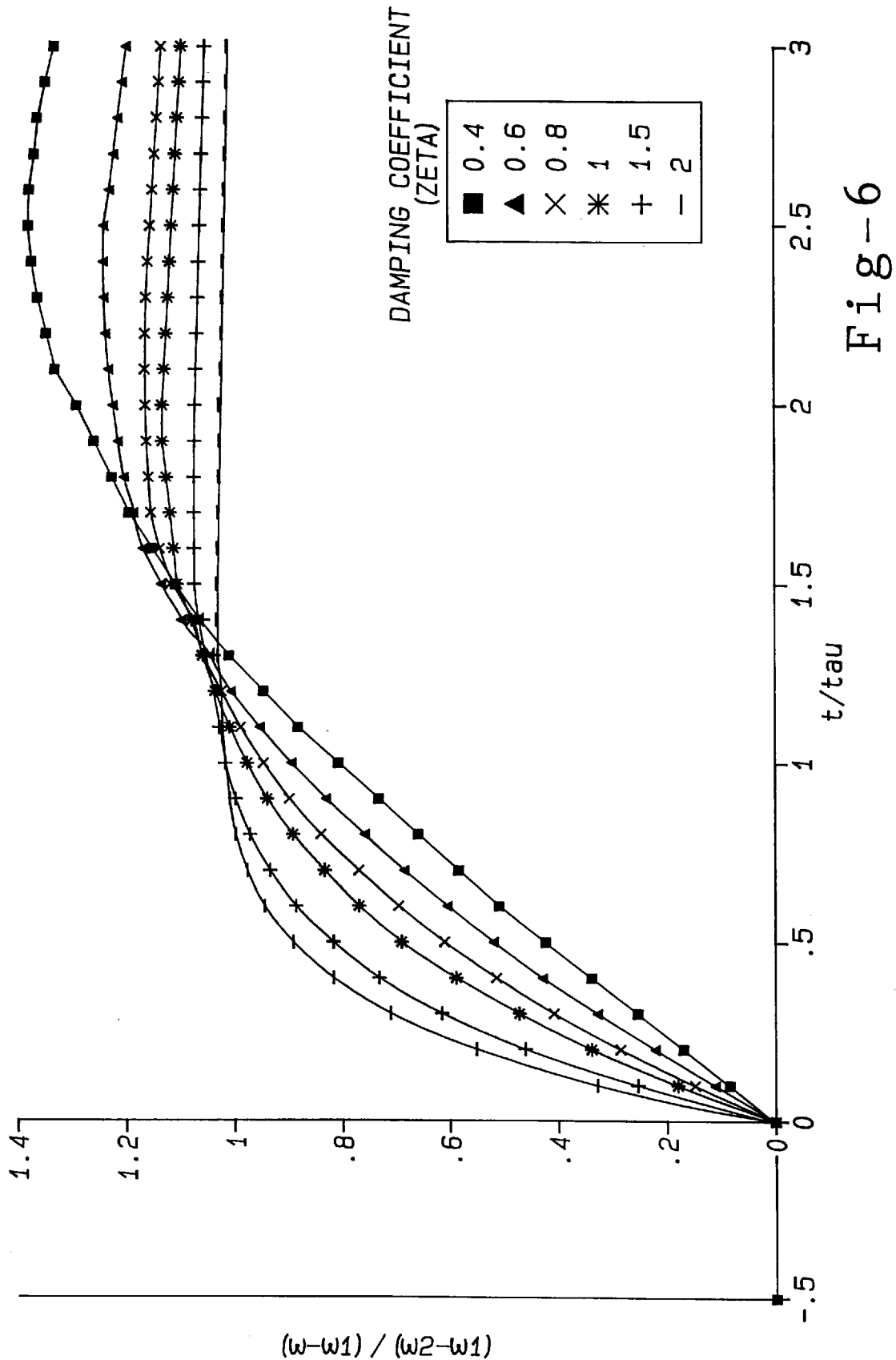
FIG. 6 is a graph showing the dynamic response of the speed to a step change in reference speed for various values of the damping coefficient.
Figure 7:
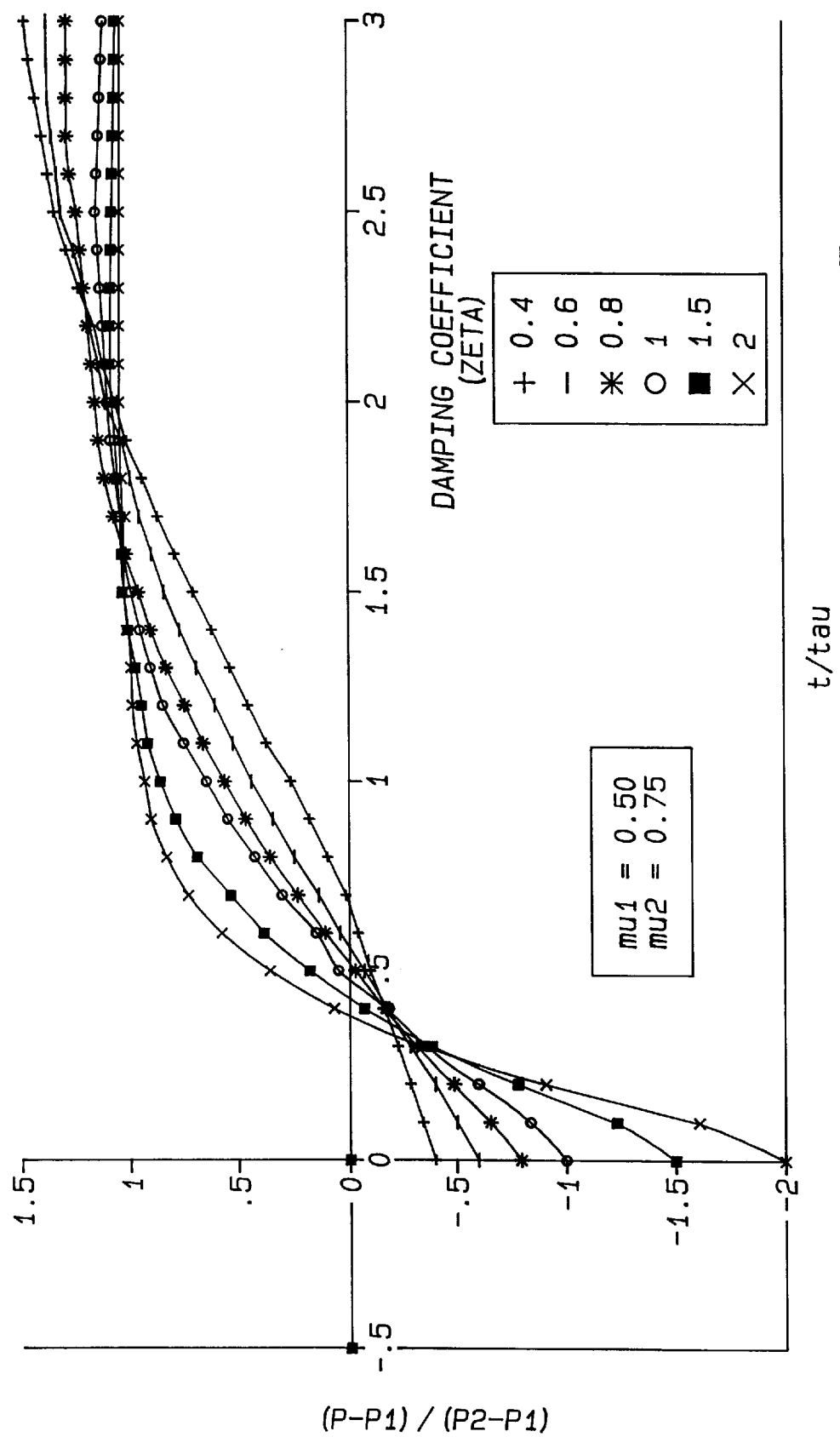
FIG. 7 is a graph of the dynamic response of the load power to a step change in the reference speed for various values of the damping coefficient.

The dynamic response of the speed to a step change, $w_2 - w_1$, in reference speed for various values of the damping coefficient, $\zeta$ is shown in FIG. 6. The damping coefficient is varied between 0.4 and 2.0. FIG. 7 shows the dynamic response for the load power P to a step change in the reference speed for various values of the damping coefficient, $\zeta$.

It should be noted that the transfer function, $\mathcal{L}$, shown in equation (2) above is such that for some values of the various parameters involved, the load torque may be negative, i.e., the system will have to consume power from the outside to accelerate it fast enough to the new speed. For this not to occur, the following relation must be satisfied:

$$\zeta/\tau < T_E/[2I(\omega - \omega_{ref})_{max}] \qquad (3)$$

Figure 8:
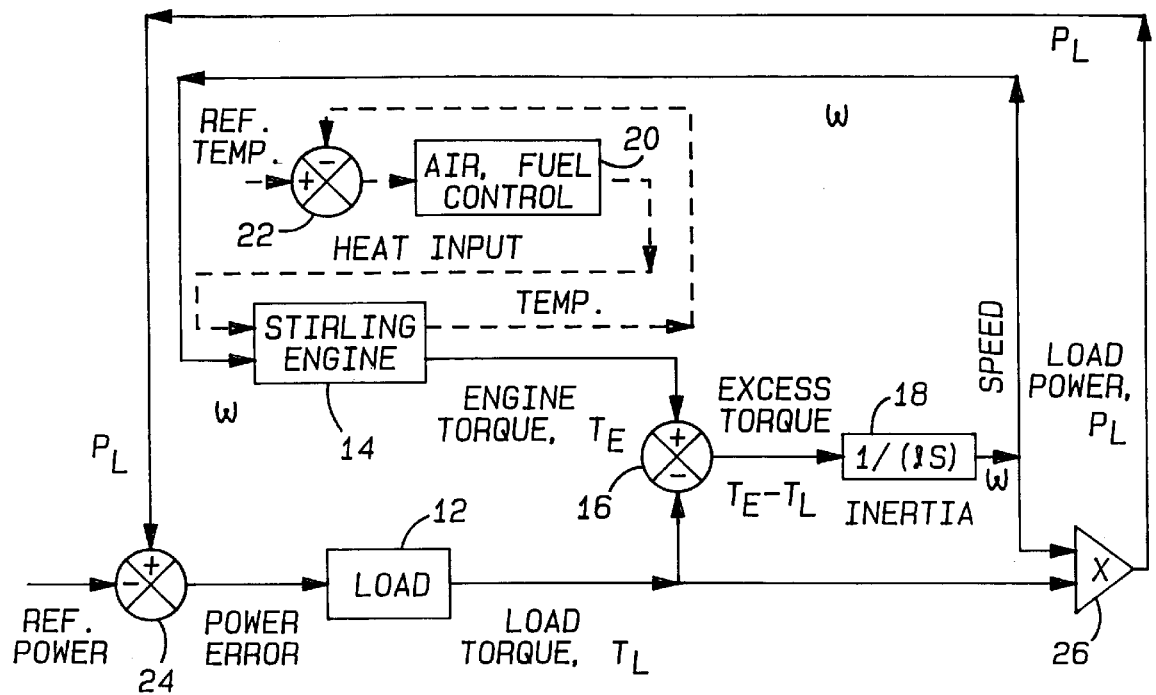
FIG. 8 is a simplified block diagram of a power control scheme equivalent to the speed control scheme shown in FIG. 5.

FIG. 8 shows, in a block diagram, a power control scheme that is equivalent to the speed control scheme shown in FIG. 5. The load power $P_L$ is compared at 24 to the reference power, $P_{ref}$. The power error, or desired power change is then converted to a desired load torque by the transfer function $\mathcal{L}$ at 12. The load torque $T_L$ is compared with the engine torque $T_E$ at 16. The difference then produces a new speed $\omega$. This speed is multiplied by the load torque at 26 to determine a load power, $P_L$.

Figure 9:
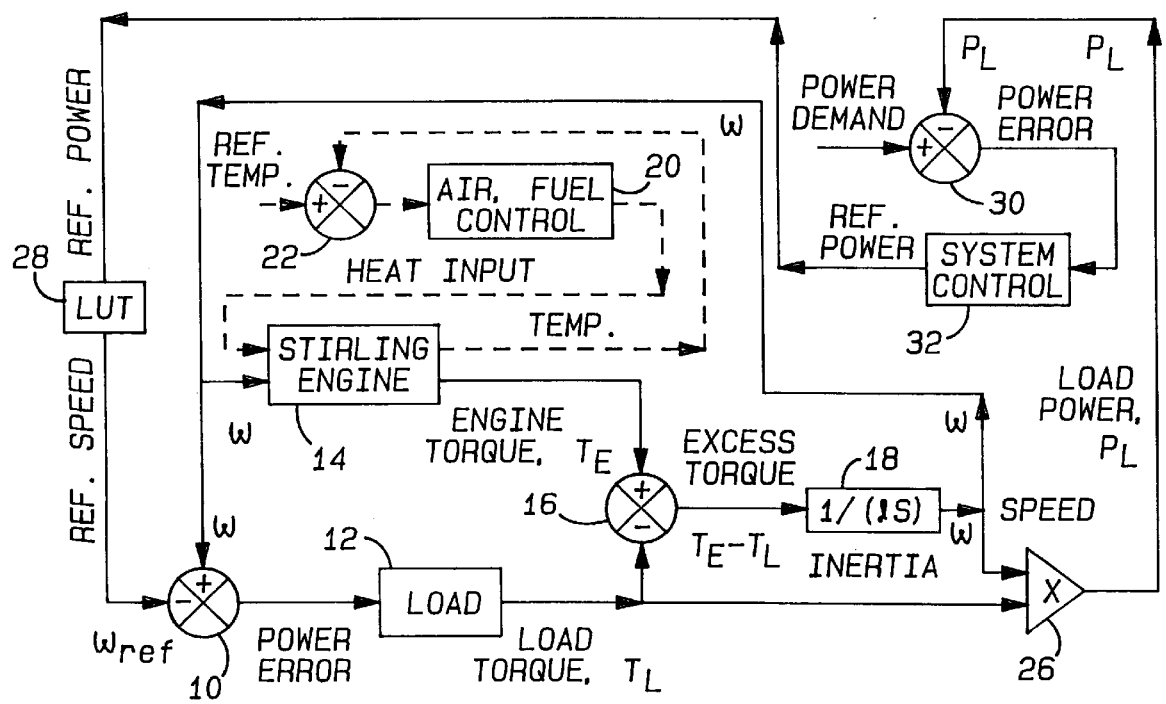
FIG. 9 is a block diagram of a modified power control scheme in which the reference power has been converted to a reference speed.

This scheme is unstable due to the temporary power excursion in the "wrong" direction resulting in a positive feedback. Power control cannot be implemented in this manner. It is possible, however, to translate the reference power signal into a reference speed signal (the two are related roughly by a constant factor) in applying the speed control scheme described above as shown in FIG. 9. This scheme will also be unstable unless changes in the reference power signal are ignored while the speed control loop is executed. Due to the relationship between the reference power and the reference speed, a look-up table 28 (or equivalent equation) is used to determine the reference speed from the reference power. The load power, $P_L$, is compared with the power demand at 30 to determine the power error. The system control 32 determines a reference power based on the power error.

Figure 10:
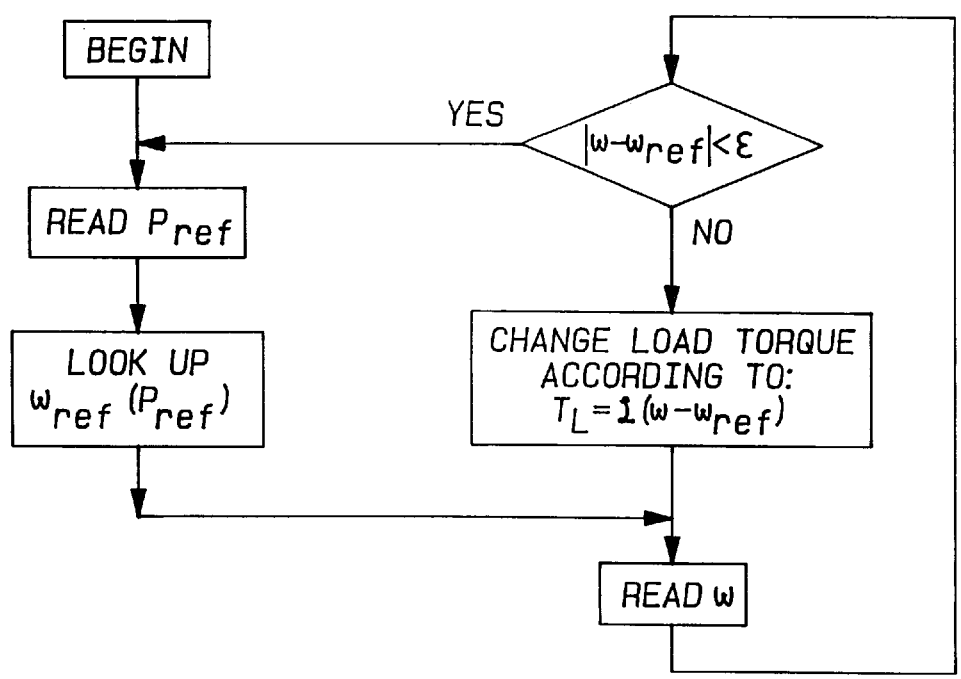
FIG. 10 is a flow chart showing a digital power control scheme.

Using digital control, the power control scheme is shown by the flow chart of FIG. 10. This is a stabilized power control scheme. Here, again the reference power signal is converted to a reference speed signal. The speed control loop is implemented until the difference between actual speed and reference speed is less than a predefined error $\epsilon$. Only then does the control return to power where the actual power is compared to the reference power.

The present invention provides a method to control the power of an engine by means of load torque modulation. The load torque undergoes a temporary excursion in the "wrong" direction to achieve the desired change in the engine power.

It is to be understood that the invention is not limited to the exact construction illustrated and described above, but that various changes and modifications may be made without departing from the spirit and scope of the invention as defined in the following claims.

We claim:

1. A method of controlling speed of an engine comprising the steps of:
    determining a current engine speed;
    determining a desired speed;
    comparing the desired speed to the current speed and determining a desired speed change;
    determining a load torque to produce the desired speed change;
    changing load torque to the determined load torque; and
    as engine speed changes following the change in load torque, changing heat input to the engine.

2. The method of claim 1 wherein the step of determining the load torque utilizes a predetermined transfer function.

3. The method of claim 1 wherein the load torque is determined using the following transfer function:

$$(I/\tau)[2\zeta + 1/(\tau S)]$$

where I is a combined inertia of the engine and driven equipment, $\tau$ is a time constant, $\zeta$ is a damping coefficient and S is a differential operator.

4. The method of claim 3 wherein $\zeta/\tau < T_E/[2I(\omega - \omega_{ref})_{max}]$ and $T_E$ is engine torque, $\omega$ is the current speed, and $\omega_{ref}$ is the desired speed.

5. A method of controlling power of an engine comprising the steps of:
    while operating the engine at a given engine power, $P_E$, detecting a demand for a change in engine power to a reference power $P_{ref}$;
    comparing the reference power, $P_{ref}$, to the engine power, $P_E$, and determining a power difference;
    determining a load torque to produce the desired engine power;
    changing load torque to the determined load torque; and
    as engine speed changes following the change in load torque, changing heat input to the engine.

6. The method of claim 5 wherein the step of determining the load torque utilizes a predetermined transfer function.

7. The method of claim 5 wherein the load torque is determined using the following transfer function:

$$(I/\tau)[2\zeta + 1/(\tau S)]$$

where I is a combined inertia of the engine and driven equipment, $\tau$ is a time constant, $\zeta$ is a damping coefficient and S is a differential operator.

8. A method of controlling power of an engine comprising the steps of:
    while operating the engine at a given engine power, $P_E$, detecting a demand for a change in engine power to a reference power, $P_{ref}$;
    determining a reference speed, $\omega_{ref}$, based on the reference power, $P_{ref}$;
    comparing the reference speed, $\omega_{ref}$, to current engine speed and determining a speed difference;
    determining a load torque to produce the speed difference;
    changing load torque to the determined load torque; and
    as engine speed changes following the change in load torque, changing heat input to the engine.

9. The method of controlling engine power of claim 8 wherein said reference speed, $\omega_{ref}$, is determined from said reference power by a look-up table.

10. An engine speed and power controller for an engine comprising:
    means for determining a current engine speed;
    means for determining a desired speed;
    means for comparing the desired speed to the current speed and determining a desired speed change;
    means for determining a load torque to produce the desired speed change;
    means for changing load torque to the determined load torque; and
    means for changing heat input to the engine as engine speed changes following the change in load torque.

11. The engine speed and power controller of claim 10 wherein said means for determining the load torque utilizes a predetermined transfer function.

12. The engine speed and power controller of claim 10 wherein said means for determining the load torque utilizes the following transfer function:

$$(I/\tau)[2\zeta + 1/(\tau S)]$$

where I is a combined inertia of the engine and driven equipment, $\tau$ is a time constant, $\zeta$ is a damping coefficient and S is a differential operator.

13. A method of controlling speed of an engine having essentially fixed or constant engine torque and driven equipment having variable load torque, said method comprising the steps of:
    determining a current engine speed;
    determining a desired speed;
    comparing the desired speed to the current speed and determining a desired speed change and desired speed change direction;
    determining a load torque to produce the desired speed change;
    changing the load torque of the driven equipment to the determined load torque, said change in load torque involving a temporary excursion of the load torque in a direction opposite the desired speed change direction; and
    changing heat input to the engine in the same direction as the desired speed change direction.

* * * * *

UNITED STATES PATENT AND TRADEMARK OFFICE
CERTIFICATE OF CORRECTION

PATENT NO. : 5,864,770
DATED : January 26, 1999
INVENTOR(S) : Ziph, et al

It is certified that error appears in the above-indentified patent and that said Letters Patent is hereby corrected as shown below:

Column 6, Claim 8, Line 3, "ωref" should read --$\omega_{ref}$--.

Signed and Sealed this

Ninth Day of November, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,864,770
DATED : January 26, 1999
INVENTOR(S) : Benjamin Ziph, Scott Strodtman and Thomas K. Rose It is certified that error appears in the above-identified patent and that said Letters Patent is hereby corrected as shown below:

Column 1,
Line 4, please add the following statement:
-- This invention was made with Government support under NREL Subcontract No. ZCB-3-13032-01, Prime Contract No. DE-AC02-83CH10093 awarded by the Department of Energy. The Government has certain rights in this invention --.

Signed and Sealed this

Twenty-eighth Day of June, 2005

JON W. DUDAS
*Director of the United States Patent and Trademark Office*